(12) United States Patent
Bonelli et al.

(10) Patent No.: US 7,639,745 B2
(45) Date of Patent: Dec. 29, 2009

(54) SERIAL DATA LINK WITH AUTOMATIC POWER DOWN

(75) Inventors: Andrea Bonelli, Villeneuve Loubet (FR); Francois Bauduin, La Gaude (FR)

(73) Assignee: Texas Instruments Incorporated, Dallas, TX (US)

( * ) Notice: Subject to any disclaimer, the term of this patent is extended or adjusted under 35 U.S.C. 154(b) by 1503 days.

(21) Appl. No.: 10/126,142

(22) Filed: Apr. 19, 2002

(65) Prior Publication Data

US 2003/0198296 A1    Oct. 23, 2003

(30) Foreign Application Priority Data

Oct. 19, 2001    (EP) .................................. 01402729

(51) Int. Cl.
*H04B 3/00*    (2006.01)
(52) U.S. Cl. .................... 375/257; 375/219; 375/221; 327/530
(58) Field of Classification Search .................. 375/257, 375/219, 221; 330/133, 57; 331/57; 713/320; 327/530
See application file for complete search history.

(56) References Cited

U.S. PATENT DOCUMENTS 5,687,321 A    11/1997    Allen
6,114,898 A    9/2000    Okayasu
6,259,745 B1 *    7/2001    Chan ........................... 375/285
6,317,839 B1 *    11/2001    Wells .......................... 713/320
2002/0075051 A1 *    6/2002    Kuo ............................ 327/198
2002/0140504 A1 *    10/2002    Hasegawa ..................... 330/57
2003/0038676 A1 *    2/2003    Mages ......................... 330/133
2003/0185308 A1 *    10/2003    Schoenborn ................. 375/257

FOREIGN PATENT DOCUMENTS

DE    199 59 982 A1    6/2001
WO    WO 00/31650    6/2000

* cited by examiner

*Primary Examiner*—Mohammad H Ghayour
*Assistant Examiner*—Leila Malek
(74) *Attorney, Agent, or Firm*—Ronald O. Neerings; Wade James Brady, III; Frederick J. Telecky, Jr.

(57) ABSTRACT

A serial data link (10) includes a transmitter (12) using a differential transmitter cell (20) to transmit data using differential signals and a receiver (14) using a differential receiver cell (22) to receive differential signals. When the transmitter (12) is in a power-down state, the differential signals from the differential transmitter cell (20) are set to an illegal state that is detected by the receiver cell (22). Upon detecting the illegal state, unnecessary circuitry in the receiver (14) is shut off or placed in a low power state to conserve energy. When data transmission resumes, the receiver cell (22) automatically restores power to its circuitry and resumes receiving data.

9 Claims, 2 Drawing Sheets

SERIAL DATA LINK WITH AUTOMATIC POWER DOWN

CROSS-REFERENCE TO RELATED APPLICATIONS

Not Applicable

STATEMENT OF FEDERALLY SPONSORED RESEARCH OR DEVELOPMENT

Not Applicable

BACKGROUND OF THE INVENTION

1. Technical Field

This invention relates in general to communications and, more particularly, to a serial data link with automatic power down.

2. Description of the Related Art

In a typical electronic circuit, it is often necessary to communicate data between various devices in the circuit. One technique for communicating between devices is a serial data link.

Mobile electronic devices, such as mobile phones, personal digital assistants (PDAs), pagers, smart phones, notebook computers and the like, have special needs. Importantly, these devices need to conserve power as much as possible, since they use a battery for a power source. Battery life is an important criterion in selecting a mobile electronic device and, therefore, manufacturers seek to reduce power consumption as much as possible.

Maintaining multiple communications links between devices, however, can consume significant amounts of power, particularly for high-speed communications links.

Therefore, a need has arisen for a high-speed serial data link that optimizes power consumption.

BRIEF SUMMARY OF THE INVENTION

In the present invention, a serial data link comprises a differential transmitter for transmitting data using differential signals and for transmitting a predetermined differential output not used in data transmission when the differential transmitter is in a power-down state. A differential receiver circuit receives data using differential signals and detects the predetermined differential output from the differential transmitter.

The present invention provides significant advantages over the prior art. The present invention provides a serial data link where a power-down situation in the transmitter circuit is automatically conveyed and detected by the receiving circuit. The power-down conditions can be communicated between the transmitting and receiving device without routing control circuitry, which would require additional control logic and complexity.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The present invention is best understood in relation to FIGS. 1-6 of the drawings, like numerals being used for like elements of the various drawings.

Figure 1:
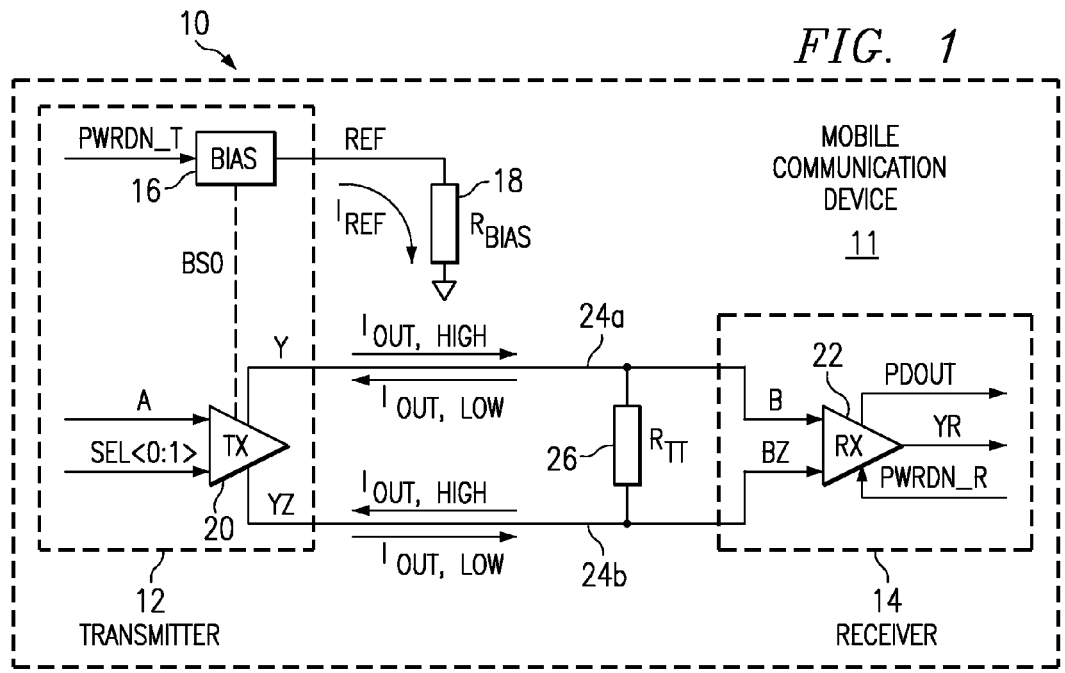
FIG. 1 illustrates a block diagram of a serial data link with an automatic power-down feature.

FIG. 1 illustrates a block diagram of a serial data link 10 that can be used for communication between devices in any circuit, but is particularly suited for communication in devices where low power consumption is a priority, such as mobile communication device 11. In the illustrated embodiment, transmitter 12 and receiver 14 are located in two separate circuits in mobile communication device 11; for example, transmitter 12 and receiver 14 may be in separate integrated circuits on a circuit board, where data communication is necessary between the two circuits. It is assumed that both transmitter 12 and receiver 14 are on the same board and their maximum distance is below 20 cm. Transmitter 12 includes a bias circuit 16 coupled to a bias resistor 18 ($R_{BIAS}$) and to a differential transmission circuit 20. Bias circuit 16 receives a power-down signal (PWRDN_T). Differential transmission circuit 20 receives the data signal (A) and, in the illustrated embodiment, optional control signals (SEL0:1) used to control transmission speed. Differential transmission circuit provides two outputs Y and YZ.

Outputs Y and YZ are received at inputs B and BZ of differential receiving cell 22 of receiver 14 over communication lines 24a and 24b, respectively. A termination resistor 26 is coupled between communication lines 24a and 24b. Typically, the termination resistor 26 is external to the transmitter 12 and receiver 14, and is placed near the pins of the receiver, especially if high-speed communication will be used (the termination resistor 26 may be placed on-chip if a suitable resistive layer is available in the technology of the receiving device, for example, by using an nwell resistor). As shown in greater detail in connection with FIG. 3, the termination resistor 26 is preferably formed using dual series resistors, with the intermediate node coupled to ground in series with a decoupling capacitor in order to prevent signal reflection in high speed mode. Also, the communications lines 24a and 24b should match in length to avoid skew between the complementary signals generated on these lines.

In addition to the Y and YZ signals, the differential receiving cell 22 may also receive a power-down control signal (PWRDN_R). The outputs of the differential receiving cell 22 include a data output YR and a power-down output (PDOUT) signal.

In operation, the bias generator 16 sets a reference current $I_{REF}$ for the differential transmitter cell 20. The bias generator may be shared with multiple differential transmitter cells 20. When a transmitter cell 20 is active, it has a static current that is a function of the external bias resistor 18 (see FIG. 2 and Table 1). Input PWRDN_T (active high in the illustrated embodiment) disables all active currents of the bias cell 16 and sets BS0 low to disable the connected differential transmitter cells 20.

Figure 2:
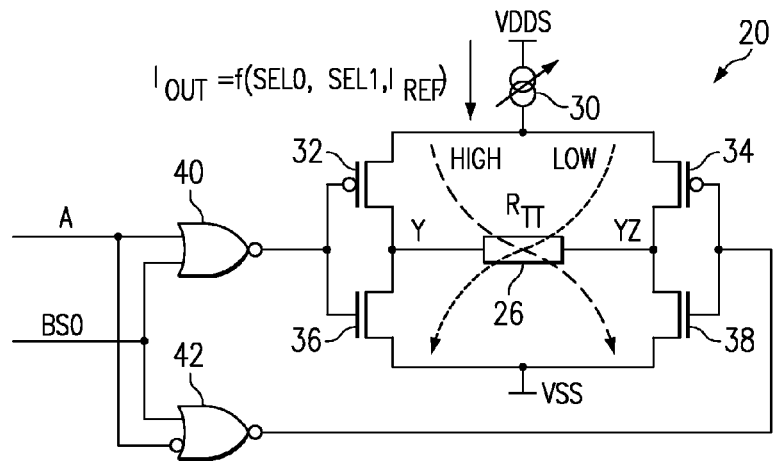
FIG. 2 illustrates a schematic diagram of a transmitter cell used to transmit data using differential signals.

The differential transmitter cell 20 is shown in greater detail in connection with FIG. 2. A variable current source 30 is coupled between VDDS (a voltage source at a voltage level slightly higher than the core voltage VDD) and first source/drains of p-channel transistors 32 and 34. The second source/drain of p-channel transistor 32 is coupled to a first source/drain of n-channel transistor 36. The second source/drain of p-channel transistor 34 is coupled to a first source/drain of n-channel transistor 38. The second source drain of n-channel transistor 36 is coupled to VSS (ground). The second source drain of n-channel transistor 38 is also coupled to VSS. The node between the second source/drain of p-channel transistor 32 and n-channel transistor 36 is the Y output. The node between the second source/drain of p-channel transistor 34 and n-channel transistor 38 is the YZ output.

The gates of p-channel transistor 32 and n-channel transistor 36 are controlled by the output of a first NOR gate 40. NOR gate 40 receives two inputs, the data A and the power-down signal from the bias cell 16, BS0. The gates of p-channel transistor 34 and n-channel transistor 38 are controlled by the output of a second NOR gate 42. NOR gate 40 receives two inputs, the inverted data signal, $\overline{A}$, and the power-down signal BS0 from the bias cell 16.

In operation, the current generated by current source 30 is a function of the reference current $I_{REF}$ from the bias generator cell 16 and the SEL0 and SEL1 control signals. Table 1 illustrates an exemplary mode of operation for the current source:

TABLE 1

Current Source Operation

| SEL1 | SEL0 | Mode | Output Current |
|---|---|---|---|
| 0 | 0 | Power-down | 0 |
| 1 | 0 | Low Speed | $2 \times I_{REF}$ |
| 0 | 1 | Medium Speed | $7 \times I_{REF}$ |
| 1 | 1 | High Speed | $20 \times I_{REF}$ |

The SEL0:1 signals can thus be used to control the magnitude of the current to fit different situations. The low speed can be used to conserve power and reduce interference where high data rates are not necessary. The high speed can be used for applications such as video that require a high data rate, albeit at a cost of power and interference.

Also, as shown in Table 1, the SEL0:1 signals can be used to initiate a power-down situation. Hence, there are two different ways that a differential transmitter cell 20 can enter a power-down state: (1) through the BS0 signal, responsive to the PWRDN_T signal to the bias generator cell 16 or (2) through the SEL0:1 signal. The difference is that the PWRDN_T signal to the bias generator cell 16 causes all connected differential transmitter cells 20 to power down, while the SEL0:1 can be used to power down individual differential transmitter cells 20.

When the SEL0:1 signals are used to enter the power-down state, the current from the current source 30 is disabled. This causes the Y and YZ outputs to be pulled to VDDS, since there is no longer a voltage drop across the terminal resistor $R_{TT}$ 26. Having Y and YZ both at a logical high state is an "illegal state". As will be discussed in greater detail in connection with FIGS. 3-6, the receiver 14 will detect this illegal state and use it as a signal to power down the receiver circuit until communications are resumed.

The second method for initiating a power-down state in the differential transmission cell 20 is through the PWRDN_T/BS0 signal. When the bias generator cell 16 receives PWRDN_T signal indicating a desired power-down state, the BS0 line is set to a logical high state. When BS0 is in a logical high state, the outputs of NOR gate 40 and NOR gate 42 are both set to logical low states, regardless of the value of the signal A. Accordingly, in this state, both p-channel transistors 32 and 34 are enabled (i.e., in conducting states) and both n-channel transistors 36 and 38 are disabled (i.e., in non-conducting states). As a result, both Y and YZ are pulled to VDDS. As in the previous case, having both Y and YZ in a logical high state is an illegal state, detected by the receiving cell 14 as a signal to enter a power-down state until communications resume.

When the PWRDN_T is disabled (i.e., no power-down state) and the SEL0:1 control signals are in a working state, the differential transmitter cell 20 works as follows. With BS0 at a logical low, the output of NOR gate 40 is the inverted data signal, $\overline{A}$, while the output of NOR gate 42 is the non-inverted data signal, A. Thus, if A is in a logical high state (and hence $\overline{A}$ is in a logical low state), p-channel transistor 32 and n-channel transistor 38 are enabled while p-channel transistor 34 and n-channel transistor 36 are disabled. This causes the current path shown as the "high" path, where the Y output will be pulled to a weak high logical state (less than 0.7*VDDS) and the YZ will be pulled to a weak low logical state. The potential between Y and YZ will be the voltage drop across $R_{TT}$, which will be dependent upon the reference current.

Similarly, while in an enabled state, if A is in a logical low state (and hence $\overline{A}$ is in a logical high state), p-channel transistor 34 and n-channel transistor 36 are enabled while p-channel transistor 32 and n-channel transistor 38 are disabled. This causes the current path shown as the "low" path, which reverses the current through $R_{TT}$, where the Y output will be pulled to a weak low logical state and the YZ output will be pulled to a weak high logical state. The potential between YZ and Y will be the voltage drop across $R_{TT}$ (with the polarity of the voltage switched from the "high" path), which will also be dependent upon the reference current.

TABLE 2

Transmitter States

| A | BS0 | Y | YZ |
|---|---|---|---|
| L | L | Weak L | Weak H |
| H | L | Weak H | Weak L |
| X | H | H | H |

Accordingly, logical high and low data states can be determined at the receiver 14 from the polarity of the voltage across $R_{TT}$. When the transmitter cell 20 is in a power-down state, that information is conveyed to the receiver by presenting an illegal state, i.e., a state with no voltage potential across $R_{TT}$.

Figure 3:
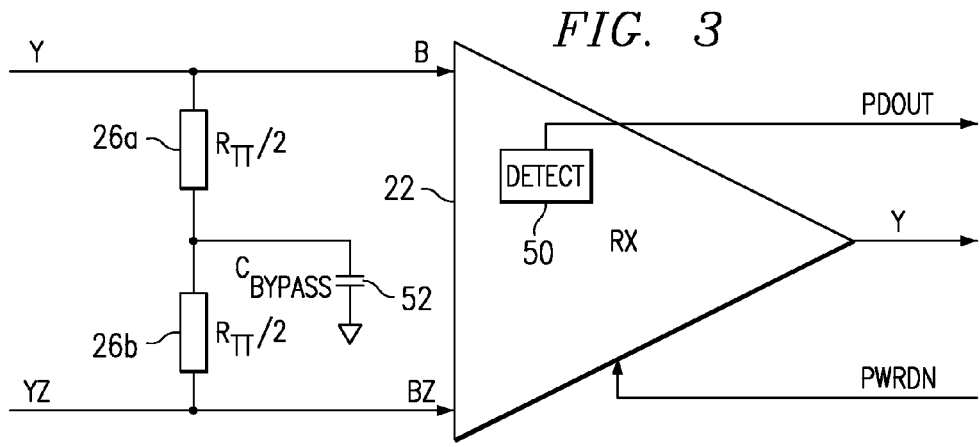
FIG. 3 illustrates a block diagram of a receiver cell used to receive differential signals have a detect circuit for detecting a power-down situation in the transmitter cell.

FIG. 3 illustrates a block diagram of the receiver cell 22. The receiver cell 22 can be of conventional design, with the addition of the detection circuitry 50, which automatically detects a power-down condition based on the output of the differential transmitter cell 20, and generates a PDOUT signal in response thereto. The receiver cell 22 also receives a PWRDN_R signal; like the PWRDN_T signal, this signal may be enabled by external control circuitry to power down the receiving cell. FIG. 3 also illustrates the use of two resistors 26a-b connected in series to implement terminal resistor 26 ($R_{TT}$), with a bypass capacitor 52 coupled between the two resistors. This arrangement suppresses reflections that might otherwise occur.

Under normal operating conditions, the receiver cell converts the weak logic levels for data transfer to rail-to-rail CMOS logic levels at the core voltage. The detect circuit 50 detects when both inputs B and BZ are above a threshold of 0.7*VDDS and generates a PDOUT signal accordingly.

Figure 4:
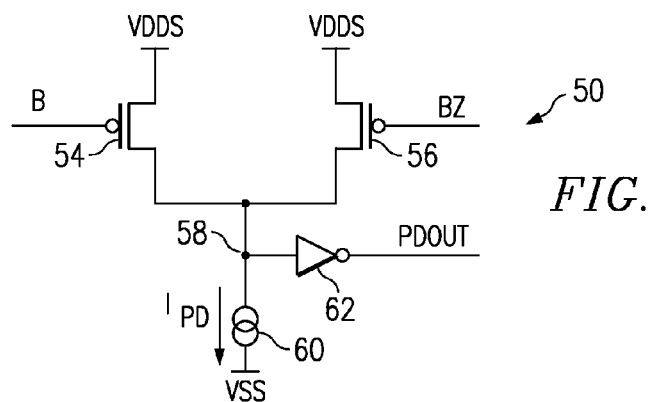
FIG. 4 illustrates a schematic diagram of the detect circuit.

FIG. 4 illustrates a preferred embodiment for the detect circuit 50. P-channel transistor 54 and p-channel transistor 56 have source/drains coupled between VDDS and a common node 58. P-channel transistor 54 has a gate coupled to the B input of receiver cell 22 and p-channel transistor 56 has a gate coupled to the BZ input of receiver cell 22. A current source 60 is coupled between node 58 and VSS. Node 58 is also coupled to the input of an inverter 62. The PDOUT signal is generated at the output of inverter 62.

In operation, when the differential transmitter cell 20 ceases transmission, either due to BS0 or SEL0:1, there is an illegal state at its output with Y and YZ at a high logical level. Both B and BZ will similarly be at a high logical level. Consequently, p-channel transistors 54 and 56 will be disabled. In this instance, current source 60 will drain any charge from node 58, causing inverter 62 to output a high logic level for PDOUT.

Once the differential transmitter cell 20 resumes transmission, the outputs Y and YZ will be at lower voltage levels and complements of one another. When Y (and thus B) is at a weak high logic state and YZ (and thus BZ) is a at weak low logic state, p-channel transistor 56 will be enabled and node 58 will be pulled to VDDS (less a voltage drop across the p-channel transistor 56). Consequently, the PDOUT signal at the output of inverter 62 will be at a logical low state. Similarly, when Y (and thus B) is at a weak low logic state and YZ (and thus BZ) is a at weak high logic state, p-channel transistor 54 will be enabled and node 58 will be pulled to VDDS. Consequently, the PDOUT signal at the output of inverter 62 will be at a logical low state.

TABLE 3

Receiver States

| B | BZ | YR | PDOUT |
|---|---|---|---|
| Weak L | Weak H | L | L |
| Weak H | Weak L | H | L |
| H | H | X | H |

Figure 5:
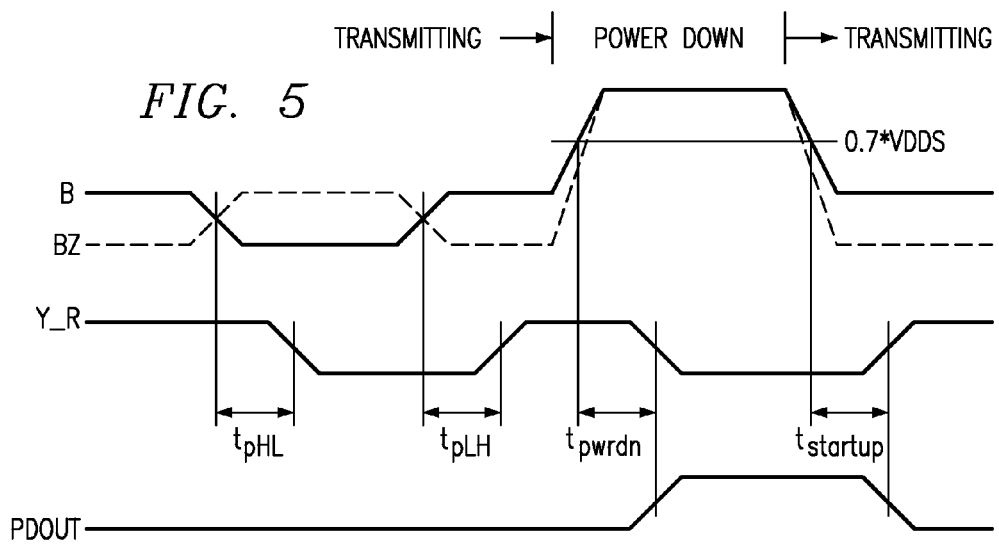
FIG. 5 illustrates a timing diagram showing transitions to and from a power-down state.

FIG. 5 is a timing diagram showing the signals relating to a transition from a transmitting state to a power-down state and back to a transmitting state. Initially, the transmitter cell 20 is in a normal transmitting state, where the outputs Y and YZ are generating weak logical high and weak logical low signals. In the illustrated embodiment, a weak high signal produces a voltage across the termination resistor 26 that is less than 0.7*VDDS. As the B and BZ inputs to the receiver cell 22 receive the weak high and low voltage levels, PDOUT remains at a logical low and YR outputs logical high and low levels responsive to the input. When the Y and YZ signals transition to the illegal state, i.e., both Y and YZ are at high logic levels above 0.7*VDDS, the PDOUT signal transitions to a logical high level after a slight delay ($t_{pwrdn}$). Once the transmission resumes and the B and BZ signals receive complementary weak high and low signals, PDOUT transitions low after a delay of $t_{startp}$.

The PDOUT signal is used by the receiver 14 to turn off circuitry that is used only when data is being transmitted over the serial link 10.

Figure 6A:
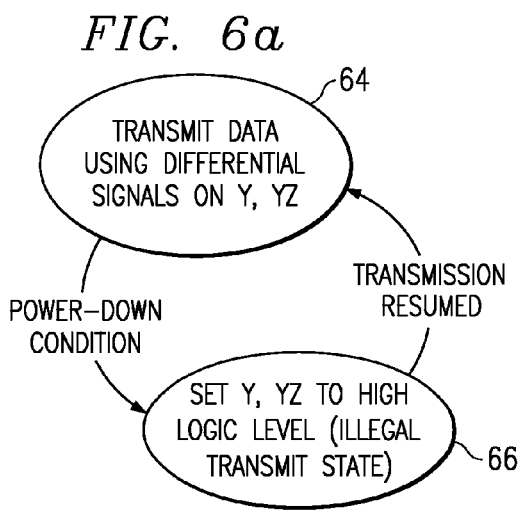
FIGS. 6a and 6b illustrate state diagrams for the transmitter cell and receiver cell.
Figure 6B:
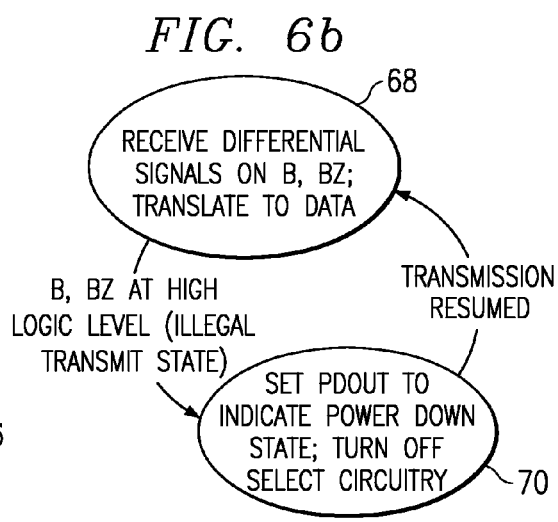

FIGS. 6a and 6b illustrate state diagrams for the differential transmitter cell 20 and differential receiver cell 22, respectively. In FIG. 6a, the transmitter cell 20 is transmitting data in a normal state 64. As described above, the data is transmitted in the preferred embodiment using complementary weak high and low signals. If a power-down condition is initiated by either the BS0 (in response to the PWRDN_T signal) or the SEL0:1 control signal, the Y and YZ outputs are set to high logic levels (greater than 0.7 VDDS) in state 66. As would be known to one skilled in the art, the Y and YZ signals could also be set to low logic levels, with the detect circuitry 50 designed to detect simultaneous low logic levels instead of high logic levels.

As shown in FIG. 6b, while the transmitter cell 20 is in the normal state 64, the receiver cell 22 is in its normal data reception state 68. When in state 68, the receiver cell 22 receives differential signals on B and BZ and translates the signals to data logic levels. When Y and YZ are both at high logic levels, B and BZ will be a high logic levels as well. This causes a transition to power-down state 70, where PDOUT is set to indicate a power-down state. In the power-down state, circuitry is disabled in the receiver 14 to conserve power.

Accordingly, the present invention provides transmitter-receiver link where a power-down situation in the transmitter circuit is automatically conveyed and detected by the receiving circuit. In the preferred embodiment described above, the power-down conditions can be communicated between the transmitting and receiving device without routing control circuitry, which requires additional control logic.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the Claims.

The invention claimed is:

1. A serial data link comprising:
 a differential transmitter for transmitting data using differential signals and for transmitting a predetermined output not used for data transmission when the differential transmitter is in a power-down state;
 a differential receiver coupled to the differential transmitter for receiving data using differential signals and for detecting the predetermined output from the differential transmitter in order to disable selected circuitry while data is not being transmitted by said differential transmitter;
 a bias generator coupled to said differential transmitter for generating a bias current for controlling the output of said differential transmitter; and
 wherein said bias generator receives a power-down control signal and generates a signal to said differential transmitter responsive to said power-down control signal.

2. The serial data link of claim 1 wherein said differential transmitter comprises first and second nodes for generating the differential signal and wherein the differential transmitter generates said predetermined output by outputting the same logic level on each node.

3. The serial data link of claim 2 wherein the differential transmitter generates said predetermined output by outputting a high logic level on each node.

4. The serial data link of claim 2 wherein the differential transmitter generates said predetermined output by outputting a low logic level on each node.

5. The serial data link of claim 2 wherein said differential receiver detects a power-down state by detecting a potential between said first and second nodes.

6. The serial data link of claim 2 wherein said differential receiver includes detect circuitry comprising first and second transistors coupled between a voltage source and a common node, where said first and second transistors are driven responsive to the output on said first and second nodes, respectively, such that a first predetermined voltage is generated on said common node when data is transmitted on said first and second nodes and a second predetermined voltage is generated on said common node when predetermined output is transmitted on said first and second nodes.

7. The serial data link of claim 6 wherein data is transmitted on said first and second nodes at voltage levels less than the voltage levels associated with said predetermined output.

8. The serial data link of claim 1 wherein said bias generator is coupled to multiple differential transmitters.

9. The serial data link of claim 8 wherein each of said multiple differential transmitters also receives an individual power-down control signal.

* * * * *

UNITED STATES PATENT AND TRADEMARK OFFICE
CERTIFICATE OF CORRECTION

PATENT NO. : 7,639,745 B2  Page 1 of 1
APPLICATION NO. : 10/126142
DATED : December 29, 2009
INVENTOR(S) : Bonelli et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2231 days.

Signed and Sealed this

Twenty-first Day of December, 2010

David J. Kappos
*Director of the United States Patent and Trademark Office*